Patented Apr. 28, 1931

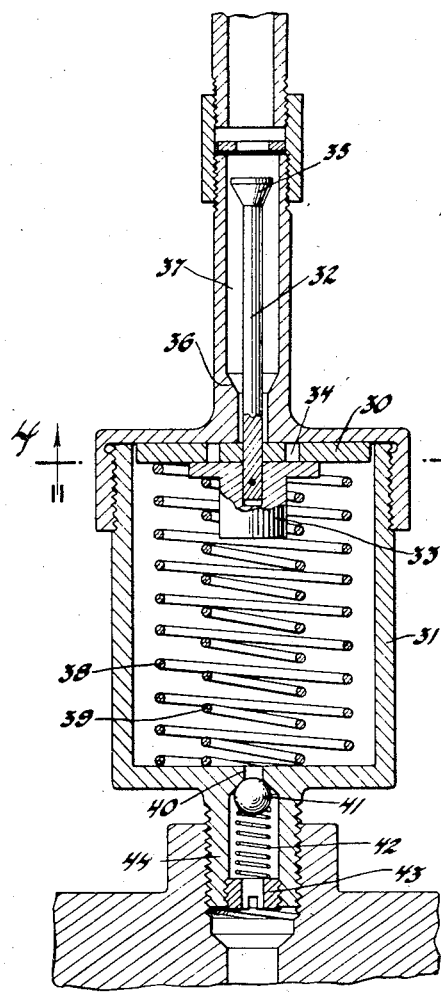
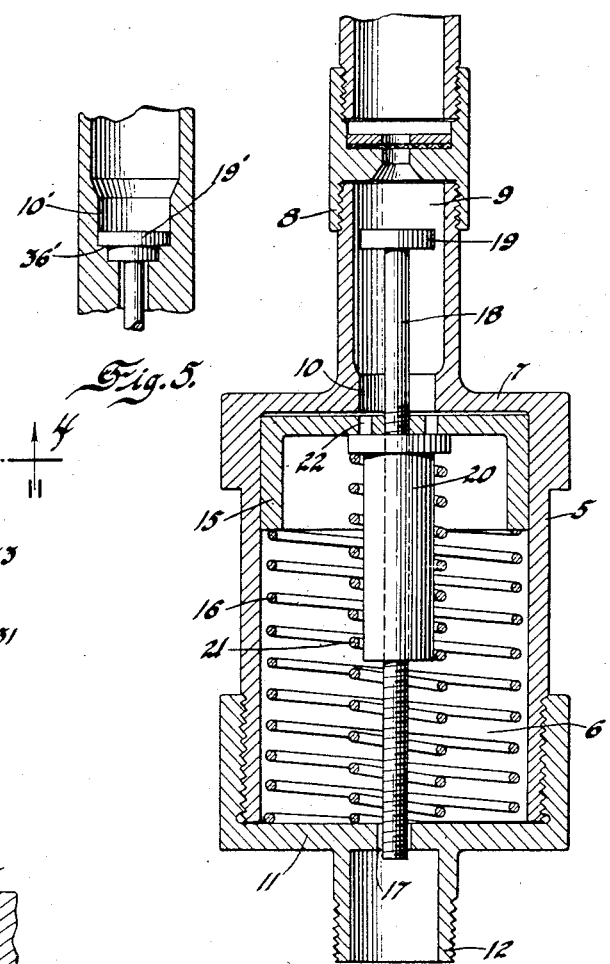
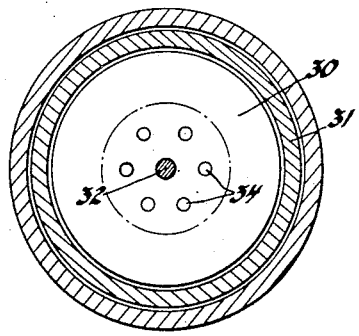
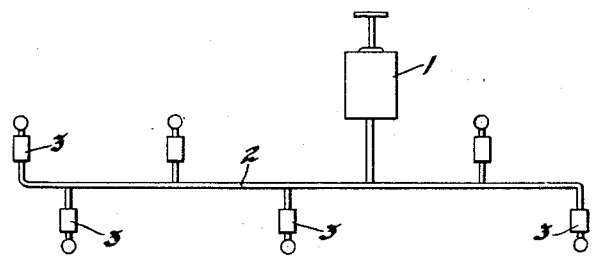

1,802,376

UNITED STATES PATENT OFFICE

VINCENT M. DIRKES AND CARL E. DIRKES, OF DETROIT, MICHIGAN

CHASSIS-LUBRICATING FITTING

Application filed September 18, 1929. Serial No. 393,431.

This invention relates to lubricating apparatus and more particularly to an improved metering device intended primarily for use with so-called central lubricating systems.

It is sometimes desirable to equip a machine or a group of machines having several bearings or other parts that require frequent lubrication and which may be located in more or less inaccessible places with a system wherein separate conduits or branches lead to each part to be lubricated from an easily accessible single source of lubricant supply. Usually, the apparatus is so arranged that pressure applied at the supply source forces lubricant to the several bearings at the same time but unless some control mechanism is provided, some of the parts will receive too much lubricant while others will not receive enough. Several schemes heretofore devised to regulate the amount of lubricant supplied individual parts of a series, have been successful to a certain extent but none of the familiar devices are entirely reliable and fool-proof under all conditions. To provide an improved device of simple and economical construction to overcome the difficulties and avoid the objections of those devices now in use is one of the primary objects of this invention.

It is a further object of the invention to provide a positive regulator for each bearing which will supply no more nor less than a predetermined measured charge upon each application of pressure under all conditions, regardless of the pressure value, viscosity or temperature of the fluid, response or action of other regulators in the system, number of bearings to be lubricated and their relative distance from the source of supply, or any other factors that have been the cause of annoyance and failure in the past.

Another object is to provide an improved and novel meter valve which will eliminate the difficulty of leakage and wherein the parts will act promptly and be restored or returned to original position quickly as soon as pressure in the system is relieved so as to be immediately ready for use again should it be desired to charge the bearings several times in succession.

A still further object of the invention is to provide a fitting to which a new charge of lubricant may be supplied for subsequent discharge to the bearing at the same time that a measured supply is being forced to the bearing under the pressure applied at the central source.

Additional objects and features of advantage will become apparent during the course of the following specification when taken in connection with the accompanying drawing.

In the drawing:

Fig. 1 is a diagrammatic view to illustrate the relation of the several parts of a pressure lubricating system.

Fig. 2 is a longitudinal sectional view of a valve device embodying the present invention.

Fig. 3 is a similar sectional view of a modification.

Fig. 4 is a transverse section taken on line 4—4 of Fig. 3.

Fig. 5 is a section showing a modified cut-off.

Referring to the drawing, the numeral 1 indicates an oil or grease gun or other suitable container or reservoir for lubricating material to be placed under pressure and which is connected by suitable conduits 2 leading to several bearings to be lubricated, each of which is provided with a regulator device 3. When pressure is applied at the source of supply, the lubricant flows through the conduits to the several bearings as will be apparent, the amount allowed to reach each bearing being controlled by a regulator valve such as will now be described.

The metering device may be fashioned as illustrated in Fig. 2, wherein 5 is a barrel or cylinder which provided the lubricant chamber or reservoir 6. One end of the chamber 6 is closed by the wall 7 which may be formed integrally with the barrel and provided with a screw threaded hollow extension 8 for attachment with a supply line or conduit leading from the source of lubricant under pressure. The opening through the extension 8 forms a passageway 9 for the lubricant flow and is provided with a portion 10 of reduced diameter leading to the interior of the chamber 6. At the opposite end of the chamber an end wall 11 is provided which may be in the form of a cap threaded on the exterior of the barrel 5 and having a hollow extension 12 for attachment with a bearing member. Within the chamber 6 is located a piston or movable wall 15 which is to be thrust upon the introduction of lubricant under pressure through passageway 9 against the tension of a coil spring 16, to force lubricant in the chamber out through the opening 17 in the bottom wall 11 and through the hollow extension 12 to the bearing.

Extending through the piston is a shaft or stem 18 having an enlargement or piston head 19 at one end in the passageway 9 and of substantially the size of the reduced bore 10, and having its opposite end screw threaded for the adjustable engagement thereon of a sleeve or nut 20 which is normally held at one end in contact with the underside of the piston 15 by a coil spring 21. This collar or sleeve 20 forms, in effect, a valve, which when seated against the piston, closes one or more bypass ports 22 in the piston, the opposite end of the sleeve being adapted to seat on the bottom wall 11 and close the outlet port 17 at one limit of its movement.

Several of these devices will be employed in the system, one being located at each bearing and each device operating entirely independent of the others to discharge a measured quantity of lubricant to the particular bearing, the volume of discharge being governed by the size of the lubricant chamber 6 and extent of piston travel therein. When pressure is applied on the lubricant at the source of supply, the lubricant flows through the passageway 9 bypassing around the sides of the head or piston 19 and acting on the main piston 15, the bypass port in which is closed by the valve device 20. As the piston 15 is forced in, the lubricant on the outlet side of the piston is discharged through the outlet 17, the piston carrying with it in its movement the valve 20 and piston head 19, until the head 19 enters the reduced portion of the passageway at 10. The close fit of the head 19 in the reduced portion 10 serves in effect to cut off the supply of lubricant to the chamber and, therefore, pressure on the piston 15, whereby the piston 15 momentarily remains stationary or lags behind the movement of the valve device 20 which continues to move because of the pressure acting directly on the head 19 to which it is connected, the valve 20 continuing its movement until it bottoms on the wall 11 and closes the outlet 17. As soon as the piston 15 and valve 20 separate the bypass port 22 is uncovered, to establish communication between opposite sides of the piston, and the tension of the spring 16 acts on the piston 15 to restore it to original position and allow the lubricant to flow through the bypass port and take the plate of that which was discharged on the pressure stroke. Thus the one application of pressure not only supplies the bearing with a given amount of lubricant but it also recharges the lubricant chamber.

So long as pressure continues in the system, the head 19 will be held in the reduced portion of the bore and the outlet 17 kept closed. It will be understood that pressure is maintained in the system until each of the metering devices has discharged its supply of lubricant and received its new charge. As soon as the pressure is relieved, the spring 21 acts to push the head 19 out of the small bore and back up the lubricant in the line until the head passes beyond the reduced bore when the lubricant will flow freely around the head as it moves through the passageway 9 to its original position. The return of the parts will be effected quickly and successive discharges may be immediately made upon repeated applications of pressure at the source of supply.

The spring 21 is preferably stronger than the spring 16 in order to offer sufficient resistance to hold the valve 20 against movement independent of and faster than the piston 15 and so prevent uncovering of the bypass ports in the piston 15 prior to the entrance of the head 19 into the restricted portion 10 of the entrance passageway. By making the spring 21 fairly stiff, a quick return of the parts is also insured.

The volume of lubricant supplied to a bearing in primarily controlled by size of the lubricant chamber. It is also dependent upon length of piston travel, which may be varied to some extent by the adjustment of the valve 20 on the threaded stem 18, whereby the entrance of the head 19 into the reduced portion 10 of the inlet passage relative to the position of the main piston 15 in its travel may be regulated.

In lieu of the construction just described, the alternative form illustrated in Fig. 3 may be employed. In this case, the piston 30 is of slightly smaller diameter than the interior of the cylinder 31 so that clearance is provided at the periphery of the piston 30. The stem 32 carried by the valve 33 for the bypass ports 34 of the piston carries a conical head 35 which is adapted to seat on the tapered shoulder 36 of the intake passageway 37 to shut off the supply of lubricant to the piston 30 after the piston 30 has been moved down against the tension of the two springs 38 and 39 to eject the lubricant through the outlet 40. Because of the clearance provided at the marginal edge of the piston, the lubricant above the piston bypasses the piston and as soon as the valve 35 reaches its seat and cuts off pressure on the piston, the spring 38 starts to return the piston and immediately opens the bypass ports 34 to accelerate the return and allow the lubricant to pass from one side to the other of the piston. The operation and structural details are otherwise as before described except that in the arrangement of the parts as shown the bottom of the valve 33 does not seat over the outlet 40. With precise dimensioning, the valve 33 could be seated over the outlet 40 simultaneously with the seating of the valve 35, but the parts are preferably and intentionally made otherwise to eliminate the necessity for accurate machining and fitting. Furthermore, it is found that with the use of grease and other heavy lubricant, there is little need for sealing the outlet, since the seating of the head 35 cuts off pressure when the measured charge of grease has been fed to the bearing. However, should it be desired to positively close the outlet when pressure is relieved, then there may be provided a ball check valve 41 yieldingly held on its seat by a coil spring 42 interposed between the ball and nut or ring 43 in the nipple 44.

As will be apparent, the co-operating sealing portions, which are shown as being conical or tapered in Fig. 3, and as having a sliding fit in Fig. 2 may be of stepped contour as in Fig. 5 or of other suitable conformation to secure a good seal. With the arrangement of Fig. 5, the line pressure is cut off, on the main piston as soon as the head 19′ enters the reduced bore 10′ and the head continues to move until it seats on the shoulders 36′.

While the above description has been of a more or less specific character, the invention is not necessarily limited to the exact details referred to and it is to be understood that such modifications can be readily made as are within the scope of appended claims.

We claim:—

1. In a pressure fluid system wherein a measured charge of fluid is to be supplied upon each application of pressure, a measuring device including a chamber of a volume corresponding to the desired amount of fluid to be supplied, a partition wall in said chamber movable upon the application of fluid under pressure upon one side to eject fluid on the other side thereof and a valve element carried by and movable with the wall for cooperation with a fixed seat in the device after the partition wall reaches a predetermined position to preclude the further action of fluid under pressure on the wall.

2. In a pressure fluid system wherein a measured charge of fluid is to be supplied upon each application of pressure, a measuring device including a chamber of a volume corresponding to the desired amount of fluid to be supplied, a partition wall in said chamber movable upon the application of fluid under pressure upon one side to eject fluid on the other side thereof and a valve element operable when the partition wall reaches a predetermined position to preclude the further action of fluid under pressure on the wall and place opposite sides of the partition wall in communication with each other.

3. A fluid pressure system wherein a measured charge of fluid is supplied upon each application of pressure, a measuring device, including a chamber, a movable wall in the chamber comprising separable parts which are initially movable in unison under the action of fluid under pressure, one of the parts having a portion which automatically precludes the pressure fluid action on the other part after a predetermined travel to separate said parts and uncover communicating ports between opposite sides of one of said parts.

4. In a fluid pressure system, wherein a measured charge of fluid is supplied for each operation of the system, a measuring device including a container of a given capacity, a piston movable in the container under influence of fluid under pressure on one side thereof to eject under pressure the fluid on the other side of the piston, elastic means to return the piston when pressure thereon is relieved, and a valve device associated with the piston and operable when the piston reaches a predetermined position to shut off the supply of fluid under pressure and open a port in the piston, whereby to equalize pressures on opposite sides of the piston and permit its return under influence of said elastic means.

5. The structure of claim 4 together with means to restore the valve device after pressure in the system is relieved.

6. A pressure lubricating system for supplying a measured charge of lubricant for each application of pressure, including a chamber for lubricant, a wall movable in the chamber to discharge lubricant on one side thereof under the action of lubricant under pressure on the other side of the wall, means carried by the wall in its discharge movement to automatically cut off the lubricant under pressure to the chamber after a predetermined range of movement and for so long as the applied pressure continues in the system, and other means to bypass lubricant from one side to the other of the wall and return the wall to its original position while the first mentioned means is active.

7. A pressure lubricating system for supplying a measured charge of lubricant for each application of pressure, including a chamber for lubricant, a wall movable in the chamber to discharge lubricant on one side thereof under the action of lubricant under pressure on the other side of the wall, means carried by the wall in its discharge movement to automatically cut off the lubricant under pressure to the chamber after a predetermined range of movement, a valve for a bypass port in the wall which remains closed during the application of pressure on the wall and opens when the pressure on the wall is relieved, and an expansible spring bearing on the wall to return the wall to original position and force the lubricant through the bypass port from one side of the wall to the other.

8. A pressure lubricating system for supplying a measured charge of lubricant for each application of pressure, including a metering chamber for lubricant, a piston movable in the chamber to discharge lubricant on one side thereof under the action of pressure supplying lubricant to the other side thereof, a spring against the tension of which the piston is movable under the action of pressure thereon, a bypass port in the piston to provide communication between opposite sides thereof, and a valve device to close the port movable with the piston and having a portion which automatically closes off the supply of lubricant to the chamber at a predetermined point in the range of piston movement and uncovers said bypass port.

9. A metering device for a pressure lubricating system to regulate the amount of lubricant supplied at each application of pressure, including a lubricant chamber, a piston in the chamber movable upon the application of lubricant under pressure on one side thereof to eject lubricant on the other side from the chamber, a valve device closing a port in the piston and movable with the piston upon the application of lubricant under pressure, a member carried by said valve device to shut off the flow of lubricant under pressure to said chamber after a predetermined range of piston movement and move the valve device to uncover said port, a spring bearing on the piston to restore the piston after the pressure in the chamber is cut off and force the lubricant through the port from one side to the other of the piston, and a spring to restore the valve device after pressure in the system is relieved.

10. A metering device for a pressure lubricating system to regulate the amount of lubricant supplied at each application of pressure, including a lubricant chamber, a passageway leading to the chamber having a portion thereof of reduced size, a piston movable in the chamber under the action of lubricant supplied through said passageway under pressure to charge the chamber, a second piston movable in said passageway and of a size substantially corresponding to the reduced portion of the passageway, an extension on the second piston projecting through the first piston and having a portion for contact with the first piston to close a port therein and to carry the second piston with the first until it enters said reduced portion of the passageway, whereby pressure on the first piston is cut off and acts on the second piston to move said contact portion away from the port and place opposite sides of the first piston in communication.

11. A metering device for a pressure lubricating system to regulate the amount of lubricant supplied at each application of pressure, including a lubricant chamber, a passageway leading to the chamber having a portion thereof of reduced size, a piston movable in the chamber under the action of lubricant supplied through said passageway under pressure to charge the chamber, a second piston movable in said passageway and of a size substantially corresponding to the reduced portion of the passageway, an extension on the second piston projecting through the first piston and having a portion for contact with the first piston to close a port therein and to carry the second piston with the first until it enters said reduced portion of the passageway, whereby pressure on the first piston is cut off and acts on the second piston to move said contact portion away from the port and place opposite sides of the first piston in communication, a spring to restore the first piston and push lubricant through said port from one side to the other, and a spring to restore the second piston after pressure in the system is relieved.

12. A metering device for a pressure lubricating system to regulate the amount of lubricant supplied at each application of pressure, including a lubricant chamber, a passageway leading to the chamber having a portion thereof of reduced size, a piston movable in the chamber under the action of lubricant supplied through said passageway under pressure to charge the chamber, a movable valve device adapted to seat over the outlet from the chamber at one limit of its movement and to seat over a bypass port in the piston at its opposite limit, a spring to hold the valve device over the piston port during piston movement on its pressure stroke, a second piston movable in said passageway of substantially the size of the reduced portion, and a connection between the valve device and the second piston, whereby the second piston is moved with the first piston on the pressure stroke until it enters the reduced portion of the passageway when the lubricant under pressure acts on the second piston to move the valve device off the bypass port and over the outlet against the tension of said springs, and a second spring active on the first piston to restore it to original position.

13. A metering device for a one shot lubricating system comprising a metering chamber having an inlet for connection with a source of lubricant under pressure, and an outlet for feeding lubricant to the bearing, a movable metering device in the chamber comprising two relatively movable parts, each of said parts being provided with yielding means to normally urge it toward the inlet end of the chamber, said parts when subjected to pressure from the source being arranged to travel toward the discharge end of the chamber to force lubricant out of the chamber through the outlet, one of said parts being provided with a port closed by the other part, said second named part being provided with a valve portion arranged to close the inlet and shut off the source of pressure when the metering device has been moved to extreme discharge position to render the line pressure available for operating the other metering devices in the system and to remove pressure from the lubricant in the metering chamber to permit the return of the first named part to normal position under influence of its yielding means.

In testimony whereof we affix our signatures.

CARL E. DIRKES.
   VINCENT M. DIRKES.